Figure 1:
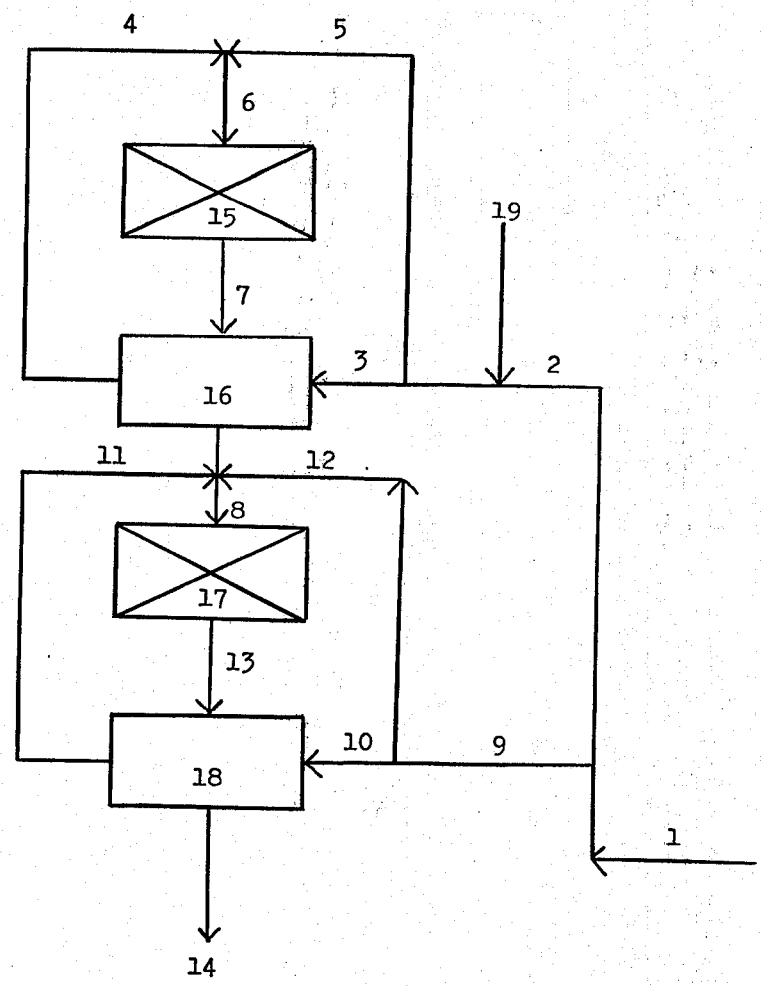

United States Patent [19]
Ohrui et al.

[11] 3,988,423
[45] Oct. 26, 1976

[54] METHOD FOR REMOVING HARMFUL MATERIALS FROM WASTE GAS

[75] Inventors: Tetsuya Ohrui, Niihama; Yasuhito Sakakibara, Saijo; Tetsuo Hoshikuma, Niihama; Osamu Imai, Niihama; Masaaki Iwasa, Niihama, all of Japan

[73] Assignee: Sumitomo Chemical Company, Limited, Japan

[22] Filed: Oct. 11, 1974

[21] Appl. No.: 514,081

[52] U.S. Cl. .......................... 423/236; 423/239; 423/245; 423/247; 423/659; 260/465.3; 260/465.9
[51] Int. Cl.$^2$ ............... B01D 53/34; A62D 3/00
[58] Field of Search .......... 423/236, 239, 247, 210, 423/213.7, 245, 210, 659; 260/465.3, 465.9

[56] References Cited
UNITED STATES PATENTS

| | | | |
|---|---|---|---|
| 3,467,492 | 9/1969 | Newman | 423/239 |
| 3,872,213 | 3/1975 | Haseba | 423/213.7 |

FOREIGN PATENTS OR APPLICATIONS

| | | | |
|---|---|---|---|
| 650,666 | 10/1962 | Canada | 423/236 |

*Primary Examiner*—Earl C. Thomas
*Attorney, Agent, or Firm*—Stewart and Kolasch, Ltd.

[57] ABSTRACT

A method for removing efficiently and economically harmful materials from a waste gas exhausted in a process for producing acrylonitrile by ammoxidation of propylene, which comprises dividing the waste gas exhausted after the absorption of acrylonitrile into two flows, mixing the first flow gas with air in an amount necessary for combustion of the combustible gas contained in the whole waste gas, subjecting the main flow gas of the mixed gas thus obtained to heat-exchange with the gas of the outlet of the first catalyst layer, combining the main flow gas with the remainder of the mixed gas, preheating thereby the mixed gas at a temperature of 200° to 450° C, passing the preheated mixed gas through the first catalyst layer wherein at least one noble metal is dispersed on an alumina carrier, and therein burning the gas at a temperature of 650° to 750° C in the presence of an excess amount of oxygen to give a combustion gas, combining the combustion gas with the second flow gas which is preheated by subjecting the main flow gas of the second flow gas to heat-exchange with the gas of the outlet of the second catalyst layer and combining the main flow gas with the remainder of the second flow gas, and thereby controlling the temperature of the combustion gas to 250° to 450° C, passing the combustion gas combined with the second flow gas through the second catalyst layer, and therein burning the gas at a temperature of the outlet of 600° to 750° C in a concentration of the remaining oxygen of 0 to 0.5 % by volume.

4 Claims, 1 Drawing Figure

METHOD FOR REMOVING HARMFUL MATERIALS FROM WASTE GAS

The present invention relates to a method for removing harmful materials from the waste gas exhausted in a process for producing acrylonitrile from propylene, ammonia and air.

Generally, in the process for producing acrylonitrile from propylene, ammonia and air, a waste gas is exhausted after the absorption of acrylonitrile. The waste gas contains hydrocarbons, carbon monoxide, hydrogen cyanide, acrylonitrile and nitrogen oxides which are harmful or release a bad smell and sometimes cause photochemical smog, and therefore, it is unfavorable to discharge the waste gas into the atmosphere without removal of the harmful materials.

There has been known a method for removing harmful materials from a waste gas comprising subjecting the waste gas containing such harmful materials to an oxidative or reductive combustion at a high temperature in the presence of a catalyst and thereby changing the harmful materials to harmless materials, and the method has been practically applied to the removal of harmful materials from a waste gas exhausted from an internal combustion engine. According to this method, the waste gas is mixed with air and the mixture is oxidatively or reductively burnt at a high temperature (e.g. above 200° C) in the presence of a noble metal catalyst such as platinum, palladium or rhodium and thereby the harmful materials contained therein are changed into harmless materials.

The present inventors have studied the application of the above method to the removal of harmful materials from the waste gas exhausted from an acrylonitrile producing plant and have found an improved method for removing harmful materials from the waste gas efficiently and economically.

An object of the present invention is to provide a method for removing efficiently and economically the harmful materials from the waste gas exhausted in a process for producing acrylonitrile from propylene, ammonia and air.

Another object of the invention is to provide an improved method for the combustion of the waste gas exhausted from an acrylonitrile producing plant and thereby changing the harmful materials contained therein to harmless materials.

These and other objects will be apparent from the description hereinafter.

It is well known that acrylonitrile can be produced by reacting propylene with ammonia and air, i.e. by the so-called "ammoxidation" reaction, and many plants for the industrial production thereof have been operated.

The waste gas exhausted from the acrylonitrile absorption tower in this process contains usually 0.5–3.0 % by volume of propylene and propane, 0.5–3.0 % by volume of carbon monoxide, 0–0.5 % by volume of cyanides and nitrile compounds (e.g. hydrogen cyanide and acrylonitrile), 0.2 % by volume or less of nitrogen oxides (predominantly nitrogen monoxide) and 0–4.0 % by volume of oxygen, and the remainder comprises predominantly nitrogen, water and carbon dioxide.

For removing simultaneously all of the harmful materials from the waste gas efficiently and economically by applying the above-mentioned known method, there are the following problems.

1. For removing efficiently the harmful combustible gas comprising predominantly propylene, propane and carbon monoxide from the waste gas by complete combustion thereof, it is advantageous to carry out the combustion reaction in an oxidative atmosphere of a high concentration of oxygen, but on the contrary, the catalytic decomposition of nitrogen oxides with hydrocarbons or carbon monoxide can be carried out in high efficiency only in a reductive atmosphere of a low concentration of oxygen.

2. The commercially available catalyst comprising a noble metal (e.g. platinum, palladium or rhodium) which is highly dispersed on an alumina carrier has a maximum permissible temperature (usually 750°–800° C) for preventing the lowering of the catalytic activity caused by overheating.

On the other hand, the concentration of the combustible gas in the waste gas is in a range of 0.5 to 5.0 % by volume, and therefore, when it is burnt completely, the temperature will theoretically exceed the maximum permissible temperature.

3. The temperature of the waste gas exhausted in the process for producing acrylonitrile is usually around room temperature, but the minimum temperature necessary for the combustion in the presence of a noble metal catalyst, i.e. the flash ignition temperature is 200° to 350° C.

4. The waste gas does not contain a sufficient amount of oxygen which is necessary for the complete combustion of the combustible gas. Accordingly, combustion air should be supplied from outside the combustion system for the efficient combustion of the combustible gas.

5. When the nitrogen-containing compounds (e.g. cyanides and nitrile compounds) which are included in an amount of 0–0.5 % by volume in the waste gas are burnt at a high temperature of 650°–750° C in the presence of a high concentration of oxygen, the nitrogen-containing compounds are partially converted into nitrogen oxides, which results in a high concentration of nitrogen oxides in the treated gas.

With respect to the above item 1, the present inventors have conducted test by using a waste gas exhausted in the process for producing acrylonitrile from propylene, ammonia and air. As the result, it has been found that the combustible gas could be removed in almost maximum efficiency in the presence of an excess amount of oxygen, i.e. 1.1 to 1.3 times of the theoretical amount of oxygen, but on the other hand, the removal rate of nitrogen oxides becomes almost zero when the concentration of the remaining oxygen at the outlet of the system is 0.7–0.9 % by volume, and further that when the concentration of the remaining oxygen is lower than the above range, the removal rate of nitrogen oxides increases, and on the other hand, when the concentration of the remaining oxygen is higher than the above range, the concentration of nitrogen oxides at the outlet of the system becomes higher than that at the inlet of the system.

From these facts, it is understood that it is very difficult to remove efficiently both the combustible gas and the nitrogen oxides on the single catalyst layer.

With respect to the above items 2 and 4, the studies have been conducted by exemplifying the waste gas containing propylene, oxygen and nitrogen.

When the waste gas contains 1.2 % by volume of propylene, 5.4 % by volume or more of oxygen must be contained in the waste gas for complete combustion of propylene. However, the waste gas contains usually only 0–4.0 % by volume of oxygen, and therefore, air must be supplied thereto for supplement of the necessary oxygen. If the waste gas is preheated at 250° C for the combustion of propylene, the temperature of the combustion gas rises to about 950° C due to the complete combustion of propylene, which far exceeds the maximum permissible temperature of the catalyst. For lowering the temperature of the combustion gas below the maximum permissible temperature, it is necessary to supply any dilution gas such as air or nitrogen.

For solving the problem of the above item 3, it is necessary to supply heat from outside the system, or to recover the heat from the combustion gas by using a heat exchanger.

With respect to the above item 5, it has been experimentally found that when the concentration of the remaining oxygen at the outlet of the system is over 0.5–0.7 % by volume, the concentration of nitrogen oxides at the outlet of the system becomes higher than that at the inlet of the system, as mentioned above.

As the results of extensive research, there has been found an improved method for removing efficiently and economically the harmful materials from the waste gas exhausted in the process for producing acrylonitrile by ammoxidation of propylene.

The method of the present invention comprises dividing the waste gas exhausted after the absorption of acrylonitrile into two flows, mixing the first flow gas with air in an amount necessary for combustion of the combustible gas contained in the whole waste gas, subjecting the main flow gas of the mixed gas thus obtained to heat-exchange with the gas of the outlet of the first catalyst layer, combining the main flow gas with the remainder of the mixed gas, preheating thereby the mixed gas at a temperature of 200° to 450° C, passing the preheated mixed gas through the first catalyst layer wherein a noble metal is dispersed on an alumina carrier, and therein burning the gas at a temperature of 650° to 750° C in the presence of an excess amount of oxygen to give a combustion gas, combining the combustion gas with the second flow gas which is preheated by subjecting the main flow gas of the second flow gas to heat-exchange with the gas of the outlet of the second catalyst layer and combining the main flow gas with the remainder of the second flow gas, and thereby controlling the temperature of the combustion gas to 250° to 450° C, passing the combustion gas combined with the second flow gas through the second catalyst layer, and therein burning the gas at a temperature of the outlet of 600° to 750° C in a concentration of the remaining oxygen of 0 to 0.5 % by volume.

Referring to the FIGURE, the method of the present invention is explained below.

FIG. 1 shows a flow sheet illustrating the steps in the process for removing harmful materials from waste gas according to the present invention.

The waste gas exhausted after the absorption of acrylonitrile in the process for producing acrylonitrile by ammoxidation of propylene has a comparatively low temperature such as about 20° to 40° C and is introduced into the system through line 1 and then divided into the first flow (line 2) and the second flow (line 9).

The divided ratio of the waste gas, i.e. the ratio of the first flow of line 2 to the second flow of line 9 is variable and depends on the components of the waste gas, the temperature of the waste gas and the diluent air, and the difference of the temperature between the outlet and inlet of the first catalyst reactor 15 and the second catalyst reactor 17. Generally, it is convenient to control the temperature of the outlet and inlet of the first catalyst reactor 15 and the second catalyst reactor 17 so as to be almost equal to each other. And therefore, the volume of the waste gas introduced into the first catalyst reactor 15 (the first flow gas) is usually 20 to 50 % by volume of the whole waste gas.

The concentration of oxygen contained in the waste gas is usually 0–4.0 % by volume, and therefore, is insufficient to complete the combustion of the waste gas and further to dilute the gas for preventing the rise in temperature induced by the combustion. Accordingly, for supplement of the insufficient amount of oxygen, air is supplied to the first flow of line 1 from line 19. The amount of the air supplied from line 19 is that necessary for the combustion of the combustible gas contained in the whole waste gas introduced from line 1 in the first and second catalyst reactors. That is, the amount of the oxygen supplied from line 19 is controlled so that the concentration of the remaining oxygen contained in the final combustion gas of line 14 is 0–0.5 % by volume. The supplemental amount of oxygen is all supplied into the first flow of line 2, and thereby, the supplemented air acts as a diluent and also prevents the temperature of the gas at the outlet of the first catalyst reactor 15 from exceeding the maximum permissible temperature of the catalyst.

Generally, the amount of air necessary for the combustion is smaller than that necessary for diluting the gas to prevent the rise of the temperature induced by the combustion. However, it is preferable to decrease the amount of the supplied air as much as possible from the viewpoint of heat economy and also the cost of the apparatus.

For this purpose, the combustion may be carried out in multiple stages and thereby the rise of the temperature in one stage may be controlled within an optional range, but, taking into consideration the cost of the apparatus and the operability thereof, an operation carried out in a few stages is preferable. The waste gas mixed with the supplemental air is further divided into line 3 and line 5. The main flow gas of line 3 is subjected to heat-exchange with the combustion gas delivered from the first catalyst reactor 15 through line 7 at the heat exchanger 16 and flowed through line 4 and then combined with the remainder of line 5. The combined gas is introduced into the first catalyst reactor 15 through line 6. The purpose to take such steps is to preheat the combined gas introduced into the first catalyst reactor 15 through line 6 to 200° C or more, preferably 250° C or more, usually 200° to 450° C so that the combustion of the combustible gas contained in the combined gas is performed effectively in the catalyst layer. The remainder of the first flow gas of line 5 is directly introduced into the first catalyst layer without going through the heat exchanger 16 for the purpose of controlling the preheating temperature of the combined gas within an appropriate range.

The preheating of the combined gas of line 6 may be not necessarily done with the combustion gas, but may be done by using other heating apparatus. However, from the viewpoint of heat economy and the cost of the apparatus, the method of heat recovery with a heat exchanger as in the above method is the most preferable.

In the first catalyst reactor 15, the waste gas introduced through line 6 is burnt and thereby the combustible gas such as hydrocarbon and carbon monoxide is removed.

The combined gas of line 6 contains a much greater amount of air (introduced through line 19) than that necessary for the combustion, and therefore, the combustion is carried out in an oxidative atmosphere of a high concentration of oxygen. As the result, the combustible gas is removed in high efficiency, but on the contrary, the nitrogen oxides are not removed and rather the concentration thereof increases owing to the oxidation of a part of the nitrogen-containing organic materials.

The catalyst used for the first catalyst reactor 15 may be the conventional one useful for the combustion of such waste gases, for instance, a commercially available catalyst wherein at least one noble metal such as platinum, palladium or rhodium is highly dispersed on an alumina carrier.

It is preferable to minimize the loss of pressure in the catalyst layer from the viewpoint of the saving of the power necessary for introducing the waste gas, and further, to select the suitable geometrical shape of the alumina carrier.

The gas burnt in the first catalyst reactor 15 has a temperature near to the maximum permissible temperature of the catalyst, for instance, the temperature of the gas becomes around 700° to 750° C. However, even at a lower temperature as 650° C, the combustible gas may be efficiently removed by using such a catalyst.

The combustion gas delivered from the first catalyst reactor 15 is introduced into a heat exchanger 16 through line 7 and therein cooled to around 450° to 650° C by heat recovery, and further cooled to around 250° to 450° C by mixing with the second flow gas of line 9 which is flowed through lines 11 and 12. The cooled combustion gas is introduced into the second catalyst reactor 17 through line 8.

The second flow gas of line 9 is further divided into two flows of lines 10 and 12 before being introduced into the second catalyst reactor 17 together with the combustion gas delivered from the first catalyst reactor 15, by which the temperature of the waste gas at the inlet of the second catalyst reactor 17 is appropriately controlled as in the case of the first catalyst reactor 15.

The second catalyst reactor 17 is at a reductive atmosphere, i.e. the concentration of the remaining oxygen at the outlet of the second catalyst reactor is 0–0.5 % by volume, and therefore, in the second catalyst reactor 17 the nitrogen oxides are removed in high efficiency and further the combustible gas is efficiently removed.

The combustion gas of line 13 delivered from the second catalyst reactor 17 has a temperature of 600° to 750° C similar to the combustion gas delivered from the first catalyst reactor, but it is cooled by subjecting to heat-exchange with the second flow gas flowed through lines 10 and 11 at the second heat exchanger 18 wherein the heat is partially recovered, and then discharged into the atmosphere through line 14. The remaining waste heat after the combustion is used for producing steam or heating.

According to the present method, the harmful materials are efficiently removed from the waste gas and further the waste heat can be efficiently recovered.

The catalyst used for the second catalyst reactor 17 may be the same sort of catalyst as is used for the first catalyst reactor 15.

Thus, according to the present invention, the efficient removal of combustible gas and the nitrogen oxides contained in the waste gas exhausted from the absorption tower in an acrylonitrile producing plant can be achieved economically and in simple apparatus and operation by minimizing as much as possible the amount of the supplemented air and further by recovering efficiently the waste heat produced by the combustion of the waste gas.

The present invention is illustrated by the following Example but not limited thereto.

EXAMPLE

After absorbing the produced acrylonitrile in the process for producing acrylonitrile by the ammoxidation reaction of propylene, the waste gas exhausted from the plant is subjected to the removal of the harmful materials in the manner as shown in the flow sheet of FIG. 1. The volume of gas flow, temperature, pressure, and components of the gas at each section are shown in Table 1.

The catalyst used in the first and second catalyst reactors is a commercially available honeycomb type catalyst wherein platinum is carried on alumina, and the reaction is carried out at a space velocity of 50,000 $hr^{-1}$.

The hydrocarbon contained in the waste gas comprises predominantly propane and propylene and further a slight amount of methane, ethane and ethylene.

Table 1

| Line No. | Volume of gas flow (N m³/h) | Temperature (° C) | Pressure (kg/cm²G) | Hydrocarbon (% by volume) | Nitrogen oxides (ppm by volume) | Hydrogen cyanide (ppm by volume) | Carbon monoxide (% by volume) | Oxygen (% by volume) |
|---|---|---|---|---|---|---|---|---|
| 1 | 32,100 | 28 | 0.27 | 0.87 | 234 | 28 | 1.81 | 0.5 |
| 3 | 15,500 | 90 | 0.25 | 0.56 | 150 | 18 | 1.16 | 3.6 |
| 5 | 5,050 | — | — | — | — | — | — | — |
| 8 | 39,450 | 372 | 0.15 | 0.43 | 199 | 13 | 0.97 | 0.6 |
| 9 | 18,900 | 28 | 0.25 | 0.87 | 234 | 28 | 1.81 | 0.5 |
| 10 | 10,300 | — | — | — | — | — | — | — |
| 12 | 8,600 | — | — | — | — | — | — | — |
| 14 | 39,450 | 505 | 0.00 | 0.04 | 48 | 0.0 | 0.09 | 0.3 |
| 15 (Inlet) | 20,550 | 325 | 0.20 | 0.56 | 150 | 18 | 1.16 | 3.6 |
| 15 (Outlet) | 20,550 | 719 | 0.18 | 0.02 | 162 | 0.0 | 0.11 | 1.5 |
| 17 (Inlet) | 39,450 | 372 | 0.14 | 0.43 | 199 | 13 | 0.97 | 0.6 |
| 17 (Outlet) | 39,450 | 693 | 0.03 | 0.04 | 48 | 0.0 | 0.09 | 0.3 |

What is claimed is:

1. A method for removing hydrocarbons, nitrogen oxides, cyanides, nitrile compounds and carbon monoxide from a waste gas exhausted in a process for producing acrylonitrile by the ammoxidation of propylene, which comprises dividing the waste gas exhausted after the absorption of acrylonitrile into two flows, mixing a part of the divided waste gas with air in an amount necessary for the combustion of the combustible gases contained in the entire waste gas, subjecting a part of the mixed gas thus obtained to heat exchange with the gas of the outlet of a first catalyst layer for the combustion of the combustible gases contained in said waste gas, combining the heated gas thus obtained with the remaining part of the mixed gas, thereby preheating the mixed gas to a temperature of 200° to 450° C., passing the preheated mixed gas through said first catalyst layer wherein at least one noble metal is dispersed on an alumina carrier, and therein subjecting the gas to oxidative combustion at a temperature of 650° to 750° C. in the presence of an excess amount of oxygen to give a combustion gas, combining the resulting combustion gas with the divided remainder of the waste gas which is preheated by subjecting a part of said divided remainder of the waste gas to heat exchange with the gas of the outlet of a second catalyst layer for the reduction of nitrogen oxides and combining the heated gas thus obtained with the remaining part of the divided remainder of the waste gas, and thereby controlling the temperature of said combustion gas to 250° to 450° C., passing the resulting mixture of the combustion gas with the preheated divided remainder of the waste gas through said second catalyst layer, and therein subjecting the gas to reductive combustion at a temperature of the outlet of 600° to 750° C. in a concentration of the remaining oxygen of 0 to 0.5% by volume.

2. The method according to claim 1, wherein the volume of the part of the divided waste gas introduced into the first catalyst layer is 20 to 50% by volume of the entire waste gas.

3. The method according to claim 1, wherein the volume of air mixed with the waste gas after it has been divided into two flows is controlled so that the concentration of the remaining oxygen contained in the final combustion gas is 0–0.5% by volume.

4. The method according to claim 1, wherein the mixed gas obtained by mixing a part of the divided waste gas with air is preheated at a temperature of 250° to 450° C.

* * * * *